US012732795B2

(12) United States Patent
Mathison et al.

(10) Patent No.: US 12,732,795 B2
(45) Date of Patent: Sep. 8, 2026

(54) SYSTEMS AND METHODS FOR LOCATING SUBSCRIBER INFORMATION

(71) Applicant: Verizon Patent and Licensing Inc., Basking Ridge, NJ (US)

(72) Inventors: James Mathison, Greer, SC (US); Barry F Hoffner, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 509 days.

(21) Appl. No.: 18/374,354

(22) Filed: Sep. 28, 2023

(65) Prior Publication Data

US 2025/0113177 A1 Apr. 3, 2025

(51) Int. Cl.
*H04W 24/08* (2009.01)
*H04W 8/20* (2009.01)
*H04W 64/00* (2009.01)

(52) U.S. Cl.
CPC .......... *H04W 8/205* (2013.01); *H04W 24/08* (2013.01); *H04W 64/00* (2013.01)

(58) Field of Classification Search
CPC .............................. H04W 24/08; H04W 8/205
See application file for complete search history.

(56) References Cited

FOREIGN PATENT DOCUMENTS

WO WO 2019072058 * 4/2019 ............ H04W 48/18

* cited by examiner

*Primary Examiner* — Myron Wyche

(57) ABSTRACT

One or more computing devices, systems, and/or methods for locating subscriber information are provided. When a trigger event occurs within a communication network (e.g., a network outage where a provisioning component is unable to provision a subscriber with a subscriber location service), the subscriber location service is transitioned from a first mode of operation to a second mode of operation. While in the second mode of operation, the subscriber location service responds to requests from a network repository service with an indicator when a subscriber cannot be found. The indicator triggers the network repository service to select and recommend one or more data stores of subscriber information for a network function to attempt for accessing the subscriber information. The network repository service may provide retry instructions to the network function for retrying the attempts to access the subscriber information one or more times.

20 Claims, 13 Drawing Sheets

Figure 1A:
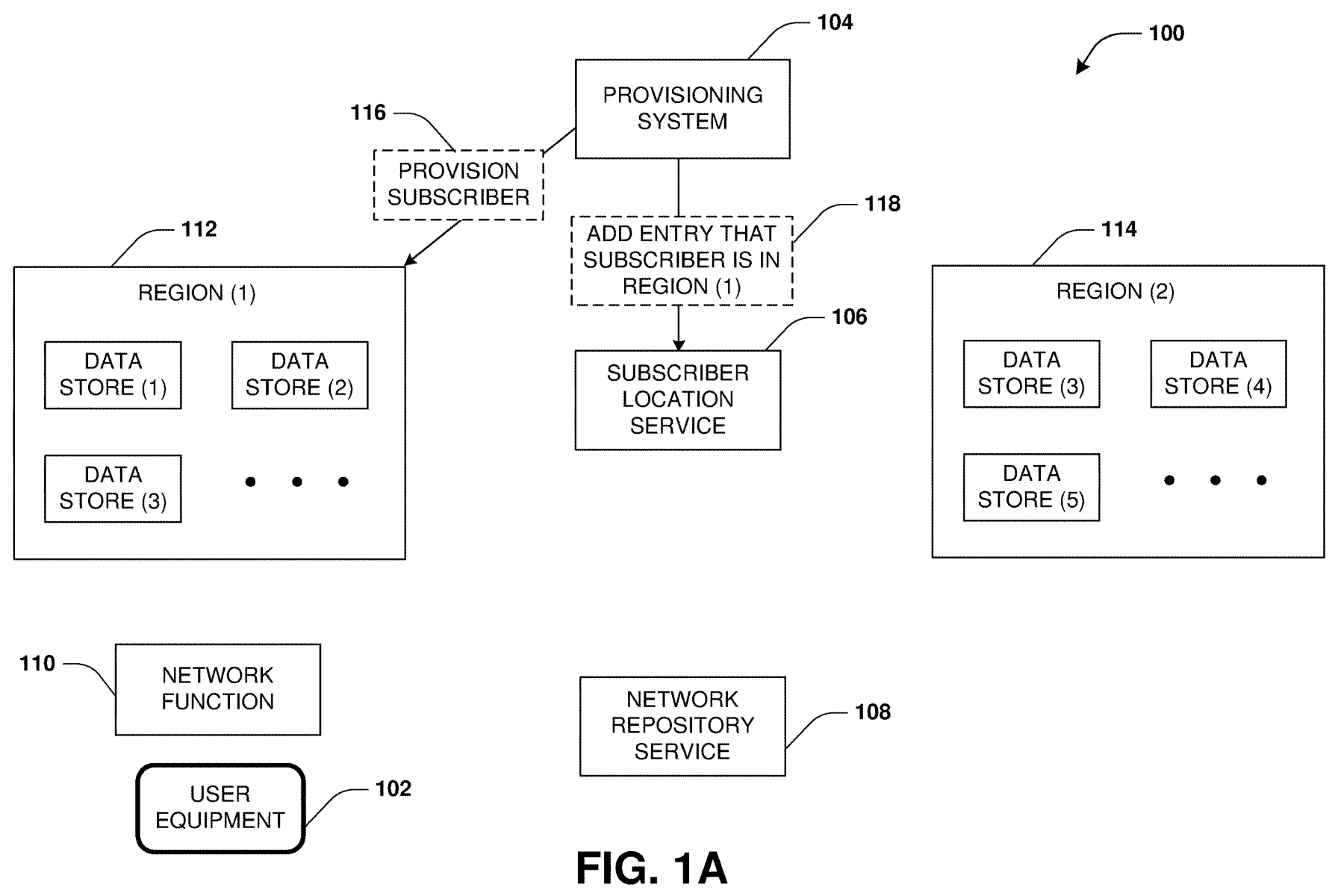

100

104
PROVISIONING SYSTEM

116
PROVISION SUBSCRIBER

118
ADD ENTRY THAT SUBSCRIBER IS IN REGION (1)

106
SUBSCRIBER LOCATION SERVICE

108
NETWORK REPOSITORY SERVICE

112
REGION (1)
DATA STORE (1)
DATA STORE (2)
DATA STORE (3)

114
REGION (2)
DATA STORE (3)
DATA STORE (4)
DATA STORE (5)

110
NETWORK FUNCTION

102
USER EQUIPMENT

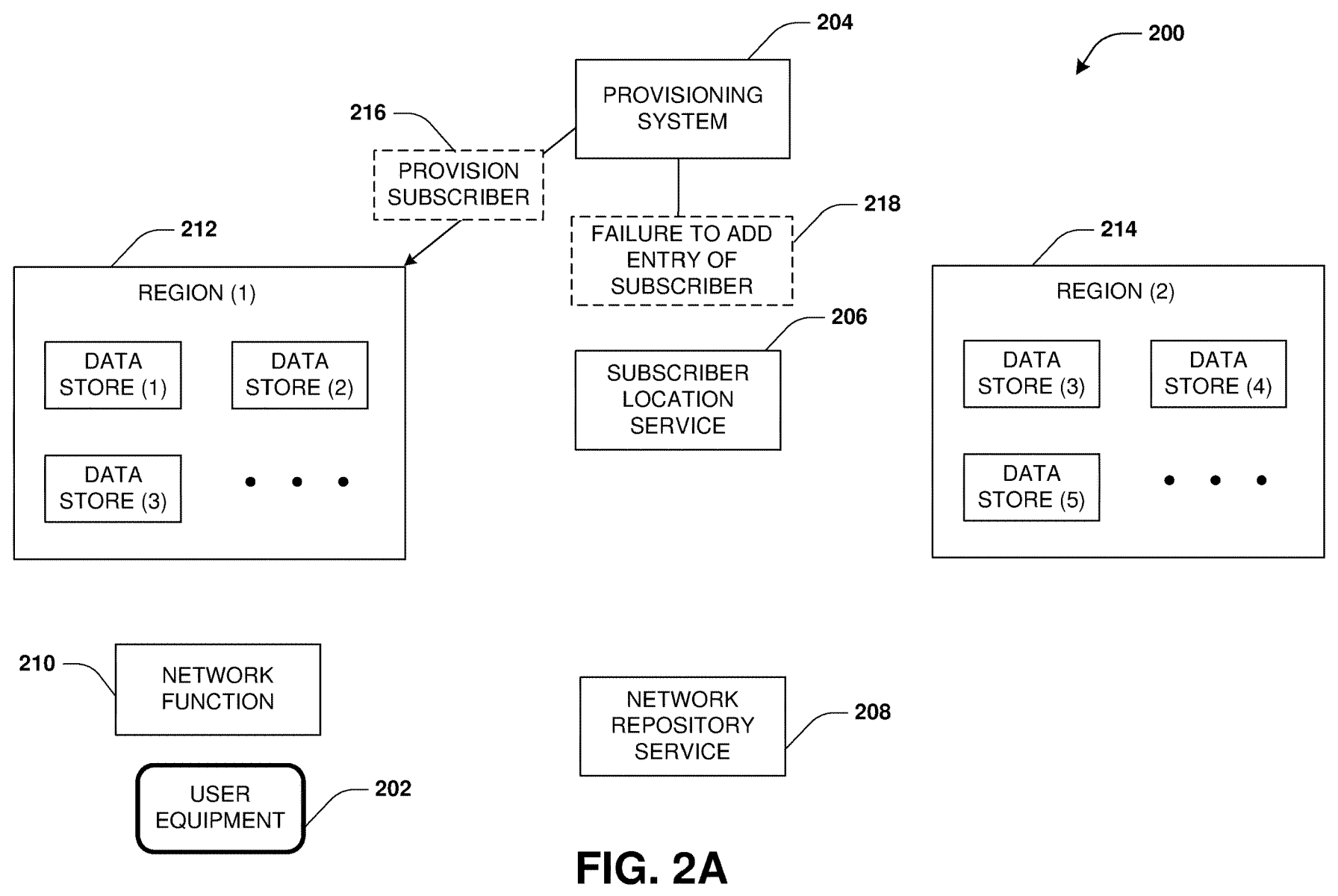

204
PROVISIONING SYSTEM

216
PROVISION SUBSCRIBER

218
FAILURE TO ADD ENTRY OF SUBSCRIBER

206
SUBSCRIBER LOCATION SERVICE

208
NETWORK REPOSITORY SERVICE

212
REGION (1)
DATA STORE (1)
DATA STORE (2)
DATA STORE (3)

214
REGION (2)
DATA STORE (3)
DATA STORE (4)
DATA STORE (5)

210
NETWORK FUNCTION

202
USER EQUIPMENT

FIG. 2A

SYSTEMS AND METHODS FOR LOCATING SUBSCRIBER INFORMATION

BACKGROUND

When a subscriber initially connects user equipment, such as a cellular phone, a cellular watch, or other types of devices, to a communication network, a provisioning system will provision the subscriber with various components and functions of the communication network. The provisioning system may provision the subscriber to a particular region within the communication network by storing a subscriber profile within a data store in that region. In this way, the subscriber information can be accessed and used to establish a communication session for the user equipment to communicate over the communication network.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIGS. 1A-1B illustrate an example of a system for locating subscriber information where a subscriber location service and/or a network repository service are operating in a first mode of operation, in accordance with an embodiment of the present technology;

FIGS. 2A-2B illustrate an example of a system for locating subscriber information, in accordance with an embodiment of the present technology;

DETAILED DESCRIPTION OF EXAMPLE EMBODIMENTS

Figure 1B:
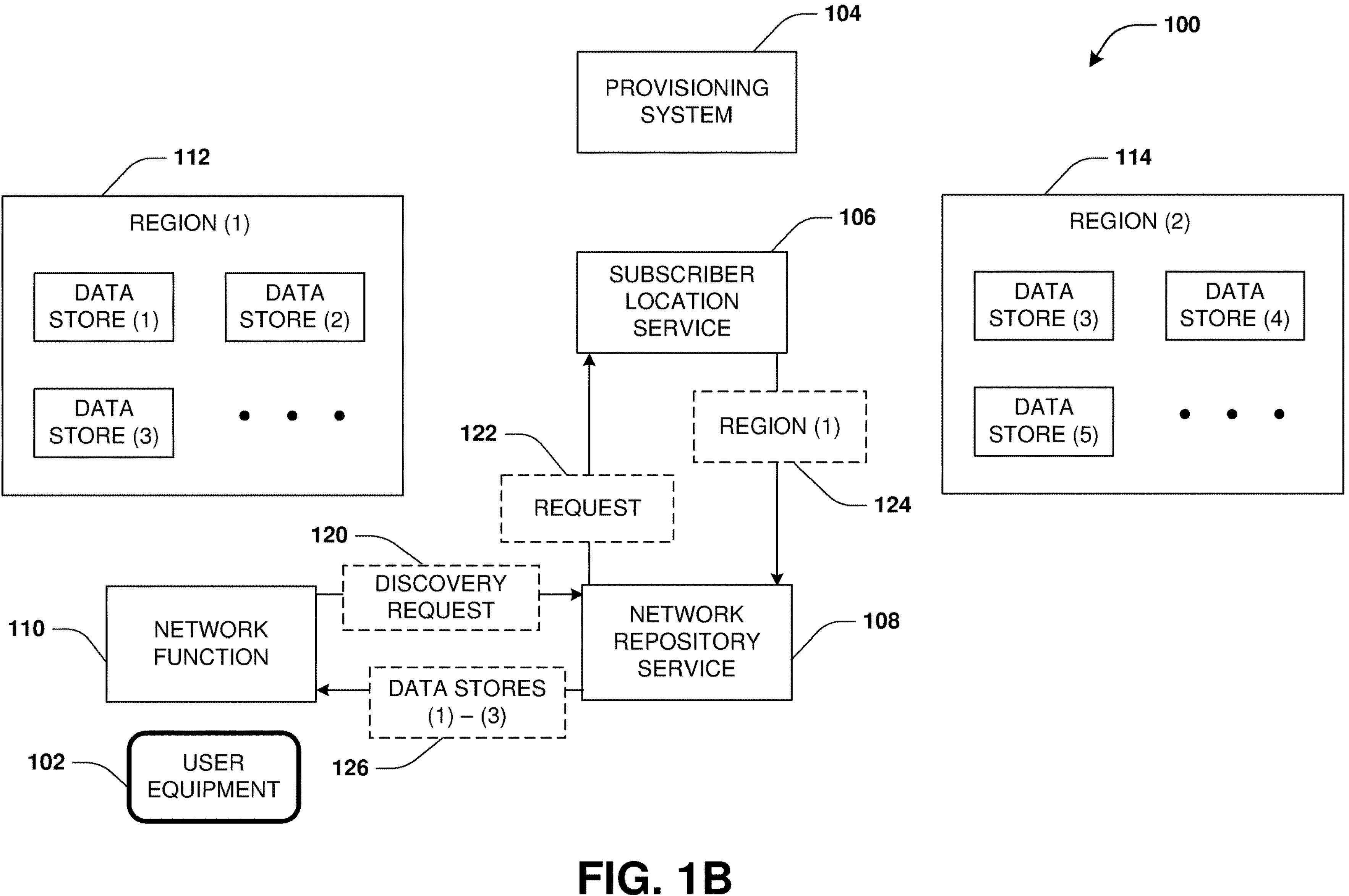

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof. The following provides a discussion of some types of computing scenarios in which the disclosed subject matter may be utilized and/or implemented.

A communication network such as a cellular network provides user equipment of subscribers (e.g., cellular phones, watches, and tablets, smarts devices, and/or other devices capable of wireless communication) with communication capabilities over the communication network. In order for a subscriber to communicate over the communication network using a user equipment device, the subscriber is provisioned across various services of the communication network. As part of provisioning, the subscriber is provisioned within a particular region of the communication network. The communication network may be partitioned into various regions such as an East region and a West region, or any other type of partitioning. Accordingly, the subscriber may be provisioned within a region that may be geographically closest to an address of the subscriber, such as the East region. When provisioning the subscriber in the East region, a provisioning system may store subscriber information such as a subscriber profile of the subscriber within a data store in the East region, which may be replicated to other data stores in the East region. A data store may correspond to a unified data management service, a unified data repository, and/or an authentication service function.

As part of provisioning the subscriber, the provisioning system also stores an entry within a subscriber location service. The entry indicates that the subscriber has been provisioned within the East region where the subscriber information can be located. The entry may map the subscriber (e.g., a mobile subscriber identity) to a data store group (e.g., a unified data management service, a unified data repository, and/or an authentication service function) within the East region.

A network function such as a session management function (SMF) may attempt to establish a session for the subscriber to communicate over the communication network using the user equipment device. The network function may transmit a request to a network repository service of the communication network for information that can be used to locate and retrieve the subscriber information of the subscriber. For example, the network function may query the network repository service (e.g., a network repository function) to discover a unified data management service (UDM) used to store the subscriber information of the subscriber. In turn, the network repository service queries the subscriber location service to identify the UDM (or other data store) within which the subscriber information can be obtained. The network repository service may provide a mobile subscriber identity or other subscriber identifier to the subscriber location service. The subscriber location service utilizes the mobile subscriber identity to identify the entry mapping the mobile subscriber identity to the data store group storing the subscriber information such as the UDM within the East region. The network repository service provides a response to the network function based upon information, regarding the data store group, provided by the subscriber location service. The response may identify the UDM where the subscriber information can be located. In this way, the network function can utilize the information to retrieve the subscriber information from the unified data management service within the East region.

During provisioning, the provisioning system may provision the subscriber within the East region by storing the subscriber information within one or more data stores of the East region. However, the provisioning system may fail to provision the subscriber with the subscriber location service due to a network outage, for example or some other issue. Thus, the subscriber location service does not include an entry for the subscriber. Any inquiries by the network repository service to the subscriber location service will result in an error that the subscriber cannot be found. Thus, the subscriber and user equipment device will be unable to communicate over the communication network because the subscriber information cannot be located by the network function for, e.g., establishing communication sessions for the user equipment device over the communication network.

The techniques provided herein overcome these technical challenges and improve the ability for user equipment devices to communicate over the communication network even when subscribers are not successfully provisioned with the subscriber location service. In particular, the communication network may be monitored for a trigger event. The trigger event may correspond to a network outage or other event where the provisioning system is unable to store the entry within the subscriber location service to map the subscriber to the data store group. In response to the trigger event being detected, the subscriber location service and/or the network repository service are transitioned from a first mode of operation to a second mode of operation. In some embodiments, the first mode of operation may be a normal operating mode where an error of subscriber cannot be found is returned if the subscriber location service does not have an entry for the subscriber.

In some embodiments where the subscriber location service is transitioned into the second mode of operation, the subscriber location service will return an indicator to the network repository service instead of the error. The indicator may include any type of information, such as an indicator that the network repository service should not return an error to the network function, an indicator that the network repository service should suggest one or more data stores for the network function to attempt for locating the subscriber information, an indicator that the subscriber location service is operating in the second mode of operation, an indicator that the subscriber location service 306 could not locate the subscriber, etc. The indicator may be conveyed as a flag, one or more bits set to a particular value, an instruction, a command, etc.

The indicator causes/triggers the network repository service to identify one or more data stores of subscriber information that can be accessed by the network function for attempting to locate the subscriber information for the subscriber. The one or more data stores may be identified from a mapping, taken as a random sample of data stores, selected such that at least one data store from each region is included, etc. In this way, the network function may attempt to obtain the subscriber information from the one or more data stores provided/suggested by the network repository service to the network function. The network function may be instructed to perform one or more retries (e.g., additional retries than a default number of retries normally performed by the network function) for attempting to retrieve the subscriber information.

In some embodiments, it is the network repository service that is transitioned into the second mode of operation based upon the trigger event, and the subscriber location service is either also transitioned to the second mode of operation or is not transitioned out of the first mode of operation. The network repository service may be transitioned into the second mode of operation because the network repository service provides the network function with instructions on what data stores to attempt, and thus the network repository service will be configured, while in the second mode of operation, to provide instructions on what data stores to attempt even though the subscriber location service could not locate the subscriber. While in the second mode of operation, the network repository service will return a response of one or more data stores to the network function to attempt. The response may be generated in response to receiving the indicator from the subscriber location service (if the subscriber location service is operating in the second mode of operation) or in response to receiving an error (if the subscriber location service is operating in the first mode of operation).

Without this innovation, the network function would receive an error from the network repository service and would not attempt to obtain the subscriber information. Thus, the subscriber would be unable to communicate over the communication network. However, with this innovation, the network function will attempt to obtain the subscriber information using the one or more data stores provided/recommended by the network repository service to the network function. In this way, the network function can provide the subscriber with communication services over the communication network if the network function is able to successfully access the subscriber information, thus improving the operation of the user equipment device of the subscriber that would otherwise be inoperable over the communication network.

FIGS. 1A-1B illustrate a system 100 for locating subscriber information where a subscriber location service 106 and/or a network repository service 108 are operating in a first mode of operation. A communication network such as cellular network may be partitioned into any number of regions, such as a first region 112 (e.g., an East region) and a second region 114 (e.g., a West region), as illustrated by FIG. 1A. Subscriber information such as a subscriber profile of a subscriber may be stored within data stores located within the regions. The subscriber information may be used by a network function 110 in order to provide user equipment 102 of the subscriber with communication capabilities over the communication network (e.g., cellular communication provided to a phone, smart watch, tablet, or other type of user equipment). In some embodiments, a provisioning system 104 may provision 116 the subscriber within the first region 112 such that the subscriber information is stored within a data store within the first region 112. The subscriber information may be replicated across other data stores within the first region 112.

As part of provisioning the subscriber, the provisioning system 104 adds 118 an entry into a subscriber location service 106. The entry may map the subscriber, identified by a mobile subscriber identity, to a data store group (e.g., a unified data management service, a unified data repository, and/or an authentication service function) within the first region 112 where the subscription information can be located.

The network function 110 may transmit a discovery request 120 to the network repository service 108 in order to determine the location of where the subscriber information of the subscriber can be located, as illustrated by FIG. 1B. The network function may utilize the subscriber information in order to establish a communication session for the user equipment 102 over the communication network. The discovery request 120 may include the mobile subscriber identity of the subscriber.

In response to receiving the discovery request 120, the network repository service 108 transmits a request 122, which may include the mobile subscriber identity, to the subscriber location service 106. Using the mobile subscriber identity, the subscriber location service 106 identifies the entry that maps the mobile subscriber identity to the data store group of the first region 112. Accordingly, the subscriber location service 106 transmits information 124 about the data store group of the first region 112 to the network repository service 108. The network repository service 108 utilizes the information 124 to determine what data store(s) stores the subscriber information, such as where the information 124 is mapped to data stores (1)-(3) in the first region 112. The network repository service 108 sends a response 126 of the data stores (1)-(3) to the network function 110. In this way, the network function 110 can use the response 126 to locate and obtain the subscriber information from a data store within the first region 112, which is used to establish the communication session.

Figure 2B:
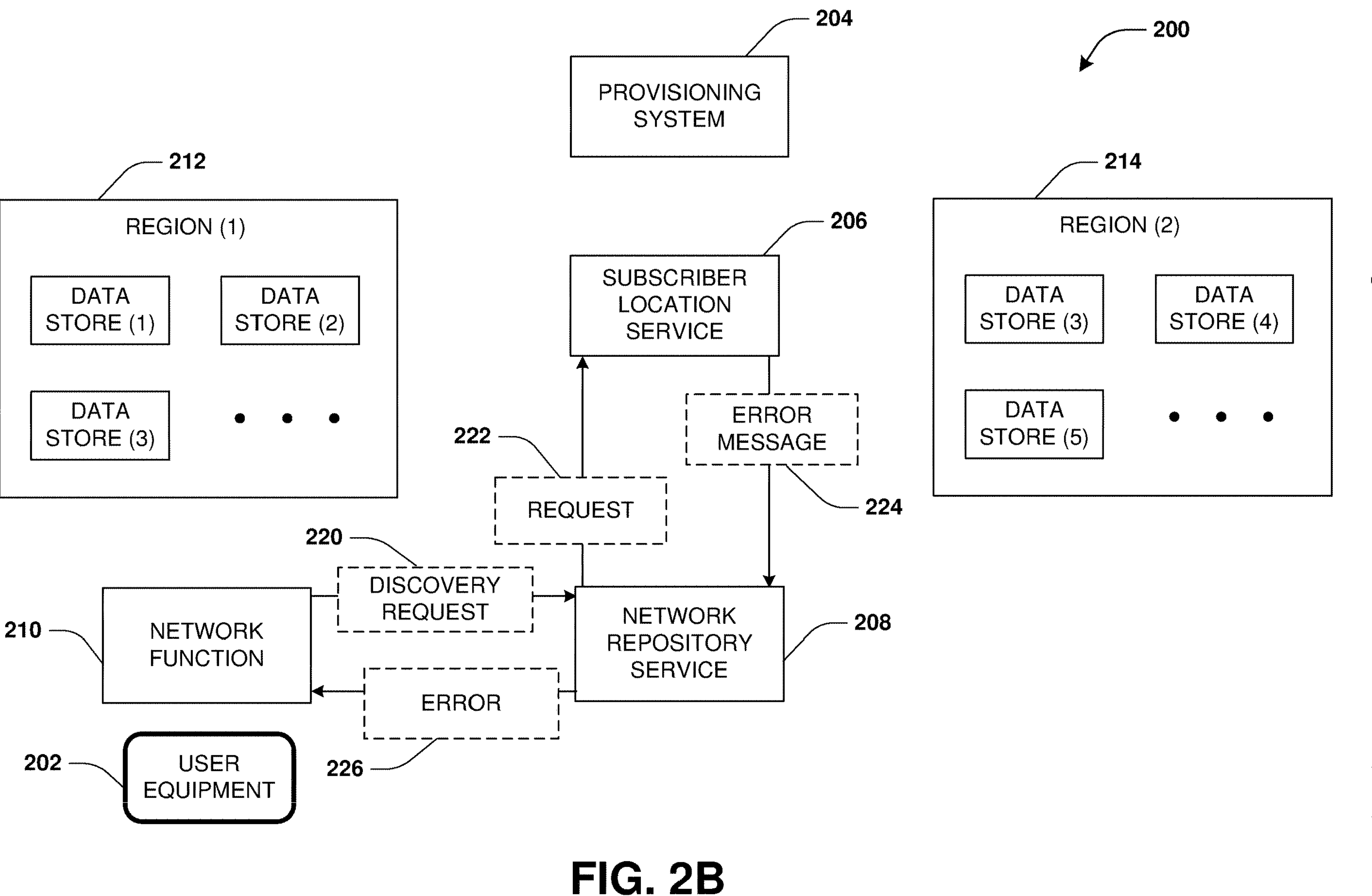

FIGS. 2A-2B illustrate a system 200 for locating subscriber information where a subscriber location service 206 and/or a network repository service 208 are operating in a first mode of operation. A communication network such as cellular network may be partitioned into any number of regions, such as a first region 212 (e.g., an East region) and a second region 214 (e.g., a West region), as illustrated by FIG. 2A. Subscriber information such as a subscriber profile of a subscriber may be stored within data stores located within the regions. The subscriber information may be used by a network function 210 in order to provide UE 202 of the subscriber with communication capabilities over the communication network (e.g., cellular communication provided to a phone, smart watch, tablet, or other type of user equipment). In some embodiments, a provisioning system 204 may provision 216 the subscriber within the first region 212 such that the subscriber information is stored within a data store within the first region 212. The subscriber information may be replicated across other data stores within the first region 212.

As part of provisioning the subscriber, the provisioning system 204 attempts to add an entry into a subscriber location service 206. The entry may map the subscriber, identified by a mobile subscriber identity, to a data store group (e.g., a unified data management service, a unified data repository, and/or an authentication service function) within the first region 212 where the subscriber information is stored. However, the provisioning system 204 fails 218 to add the entry into the subscriber location service 206, such as due to a network outage or other failure. Thus, the subscriber is provisioned within the first region 212, but is not provisioned with the subscriber location service 206.

Without the techniques described herein, the network function 210 will be unable to locate the subscriber information within the first region 212, as illustrated by FIG. 2B. The network function 210 may transmit a discovery request 220 to the network repository service 208 in order to determine the location of where the subscriber information of the subscriber can be located, as illustrated by FIG. 2B. The network function 210 may utilize the subscriber information to establish a communication session for the UE 202 over the communication network.

The discovery request 220 may include the mobile subscriber identity of the subscriber. In response to receiving the discovery request 220, the network repository service 208 transmits a request 222, which may include the mobile subscriber identity, to the subscriber location service 206. Using the mobile subscriber identity, the subscriber location service 206 attempts to identify an entry that maps the mobile subscriber identity to a data store group within a region of the communication network. Because the subscriber location service 206 does not have an entry for the mobile subscriber identity because of the failure 218 illustrated in FIG. 2A, the subscriber location service 206 returns an error message 224 to the network repository service 208. The network repository service 208 provides an error response 226 to the network function 210. Based upon the error response, the network function 210 will be unable to locate the subscriber information and will not provide the UE 202 with communication access over the communication network.

Figure 3A:
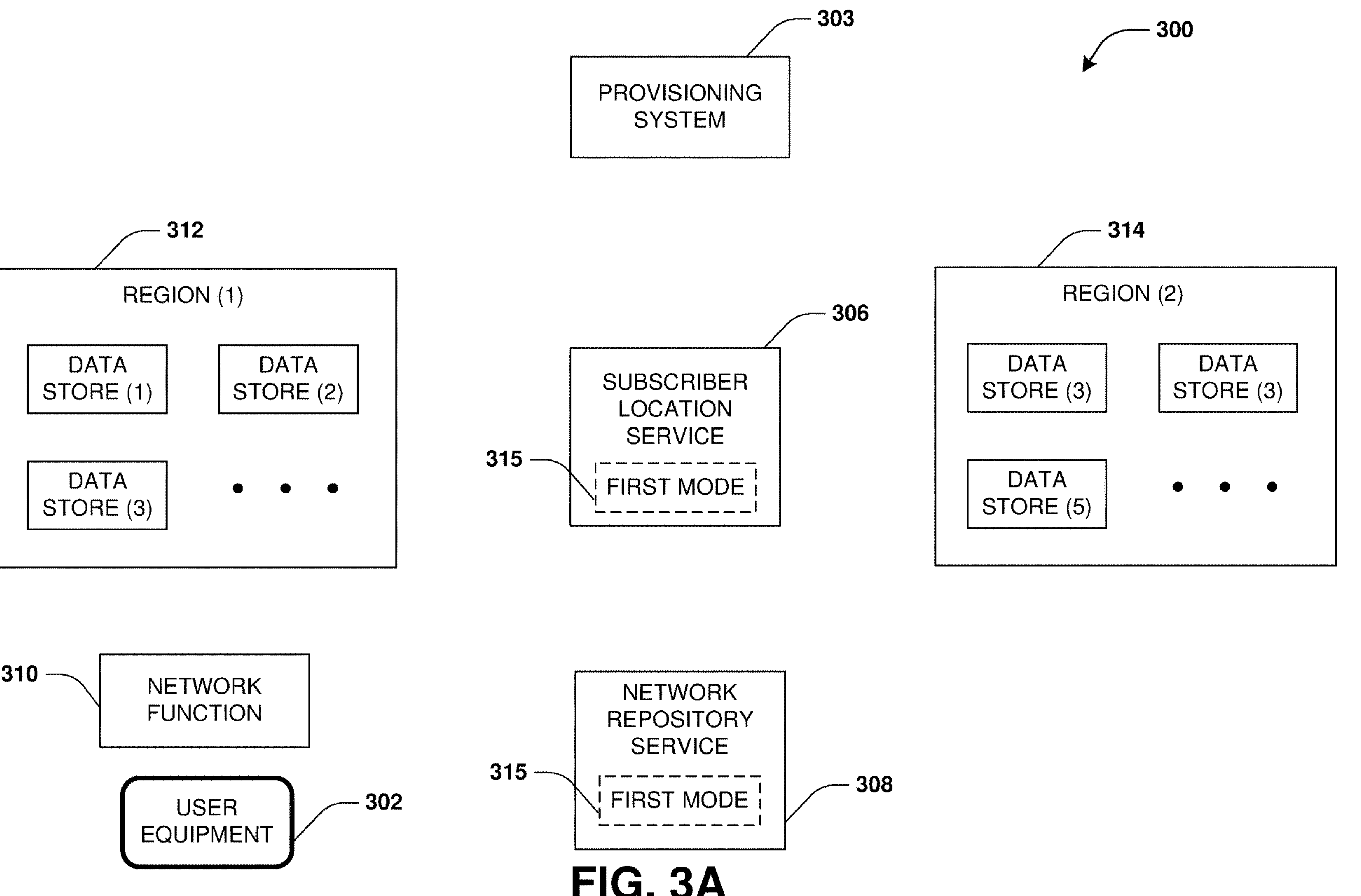
FIGS. 3A-3C illustrate an example of a system for locating subscriber information where a subscriber location service and/or a network repository service are operating in a second mode of operation, in accordance with an embodiment of the present technology.
Figure 3B:
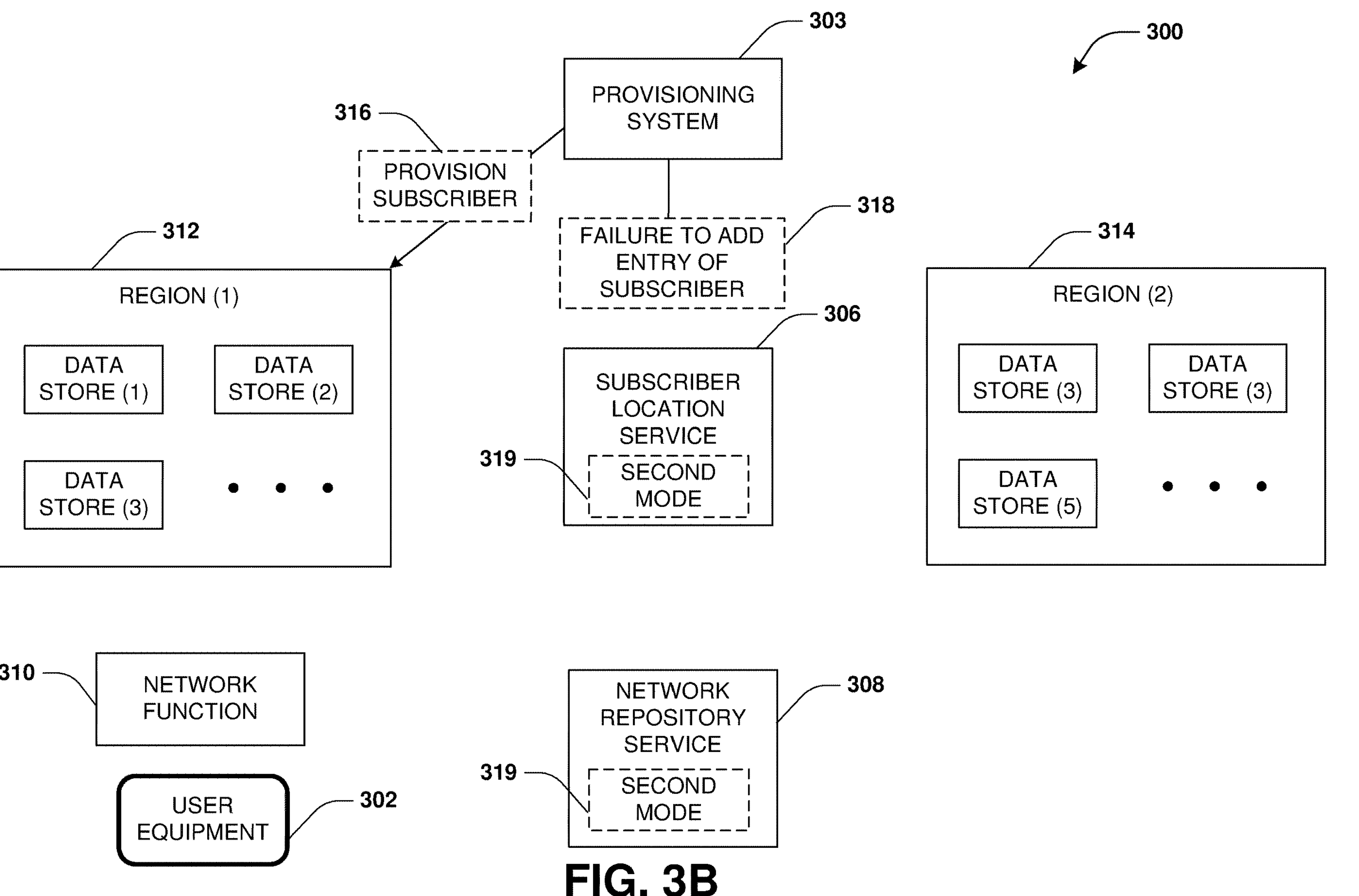
Figure 3C:
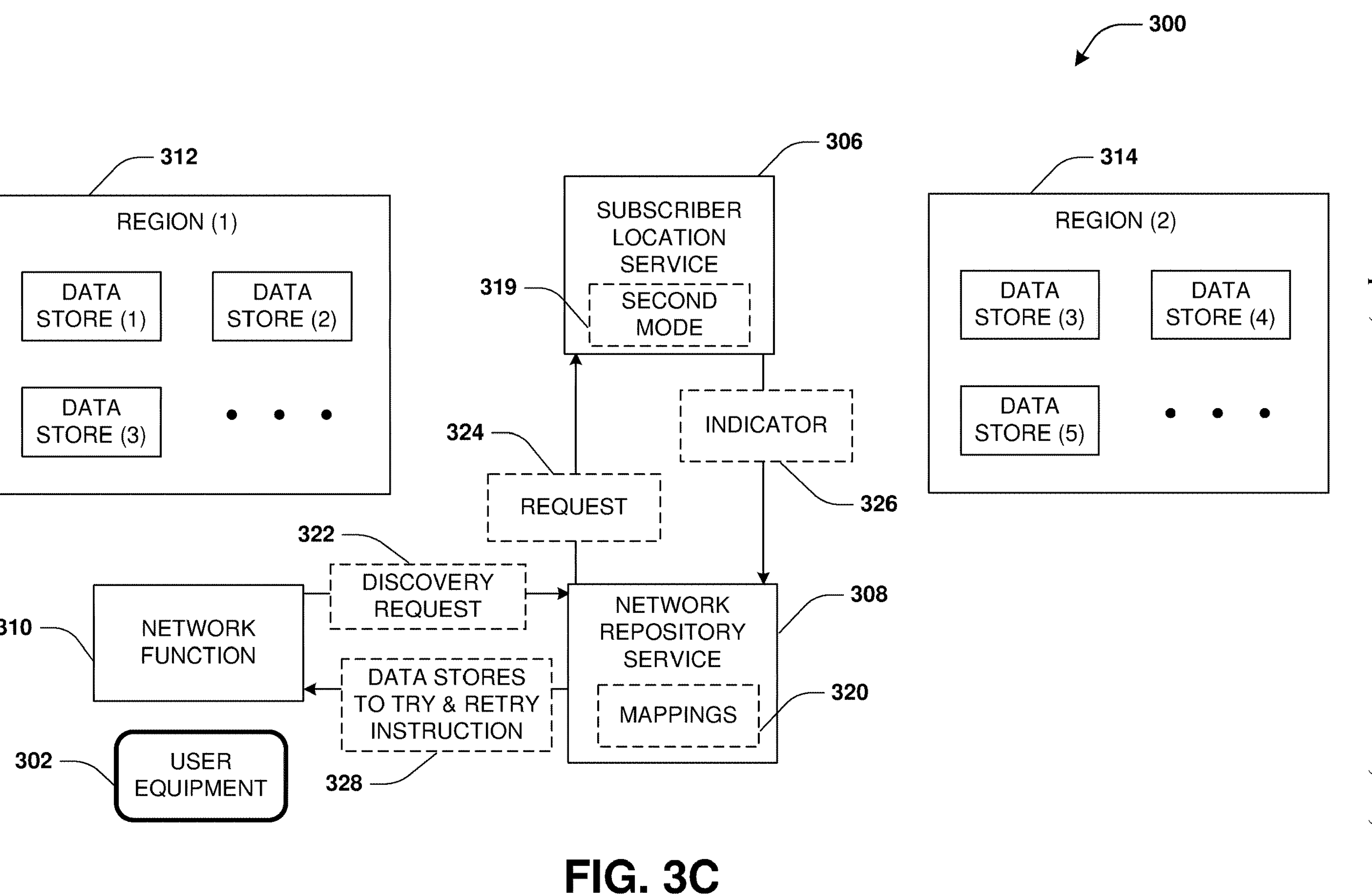

FIGS. 3A-3C illustrate a system 300 for locating subscriber information where a subscriber location service 306 and/or a network repository service 308 are transitioned from a first mode of operation 315 to a second mode of operation 319. A communication network such as cellular network may be partitioned into any number of regions, such as a first region 312 (e.g., an East region) and a second region 314 (e.g., a West region), as illustrated by FIG. 3A. While in the first mode of operation 315, the subscriber location service 306 and/or the network repository service 308 will return an error message (e.g., a subscriber not found error) if the subscriber location service 306 does not have an entry mapped to a mobile subscriber identity of a subscriber. This will cause a network function 310 to not establish a communication session for user equipment 302 of the subscriber for communication over the communication network because the network function 310 will not be able to locate subscriber information of the subscriber. While in the first mode of operation 315, if the subscriber location service 306 identifies the entry mapping to the mobile subscriber identity of the subscriber, then the subscriber location service 306 will provide information to the network repository service 308. The network repository service 308 will use the information to identify one or more data stores that store the subscriber information. In this way, the network repository service 308 will provide the one or more data stores to the network function 310 for retrieving the subscription information that can be used to connect the user equipment 302 to the communication network.

FIG. 3B illustrates a provisioning system 303 attempting to provision a subscriber within the communication network. In some embodiments, the provisioning system 303 may provision 316 the subscriber within the first region 312 such that subscriber information is stored within a data store within the first region 312, and may be replicated across other data stores within the first region 312. In this way, the subscriber information such as a subscriber profile of the subscriber may be stored within data stores located within the first region 312. The subscriber information may be used by the network function 310 in order to provide user equipment 302 of the subscriber with communication capabilities over the communication network (e.g., cellular communication provided to a phone, smart watch, tablet, or other type of user equipment).

As part of provisioning the subscriber, the provisioning system 303 attempts to add an entry into a subscriber location service 306. The entry may map the subscriber, identified by a mobile subscriber identity, to a data store group (e.g., a unified data management service, a unified data repository, and/or an authentication service function) within the first region 312 storing the subscriber information. However, the provisioning system 303 fails, at 318, to add the entry into the subscriber location service 306, such as due to a network outage or other failure. Thus, the subscriber is provisioned within the first region 312, but is not provisioned with the subscriber location service 306.

The network outage, the failure at 318, and/or other types of events may be identified as a trigger event. In response to identifying the trigger event, the subscriber location service 306 and/or the network repository service 308 may be transitioned from the first mode of operation 315 to the second mode of operation 319. In some embodiments, only the subscriber location service 306 is transitioned to the second mode of operation 319 while the network repository service 308 stays in the first mode of operation 315 (a normal operating mode). In some embodiments, only the network repository service 308 is transitioned to the second mode of operation 319 while the subscriber location service 306 stays in the first mode of operation 315 (a normal operating mode). In some embodiments, both the network repository service 308 and the subscriber location service 306 are transitioned to the second mode of operation 319.

While the subscriber location service 306 and/or the network repository service 308 are in the second mode of operation 319, the network repository service 308 may receive a discovery request 322 from the network function 310, as illustrated by FIG. 3C. The discovery request 322 may include a mobile subscriber identity for the subscriber of the user equipment 302. In response to receiving the discovery request 322, the network repository service 308 transmits a request 324, which may include the mobile subscriber identity, to the subscriber location service 306. Using the mobile subscriber identity, the subscriber location service 306 attempts to identify an entry that maps the mobile subscriber identity to a data store group of a region within the communication network. However, the subscriber location service 306 does not have an entry for the mobile subscriber identity because of the failure 318, illustrated by FIG. 3B.

Because the subscriber location service 306 is operating in the second mode of operation 319, the subscriber location service 306 refrains from transmitting an error message (e.g., a subscriber cannot be found message) to the network repository service 308. Instead, the subscriber location service 306 transmits an indicator 326 to the network repository service 308. It may be appreciated that the indicator 326 may include any type of information, such as an indicator that the network repository service 308 should not return an error to the network function 310, an indicator that the network repository service 308 should suggest one or more data stores for the network function 310 to attempt for locating the subscriber information, an indicator that the subscriber location service 306 is operating in the second mode of operation 319, an indicator that the subscriber location service 306 could not locate the subscriber, etc. The indicator may be conveyed as a flag, one or more bits set to a particular value, an instruction, a command, etc.

Upon receiving the indicator 326, the network repository service 308 refrains from transmitting an error response to the network function 310. Instead, the network repository service 308 is triggered by the indicator 326 to identify/select/determine one or more data stores for the network function 310 to attempt for obtaining the subscriber information. In some embodiments, the network repository service 308 may evaluate mappings 320 that may specify the one or more data stores. In some embodiments, the network repository service 308 may randomly select a particular number of data stores from known/available data stores. In some embodiments, the network repository service 308 may select at least one data store from each region as the one or more data stores. In this way, the network repository service 308 sends a response 328 to the network function 310 with an instruction to attempt to access the subscriber information from the one or more data stores. The response may include a retry instruction or some other indicator that instructs or triggers the network function 310 to perform one or more retries when attempting to locate the subscriber information. A default retry mechanism of the network function 310 may retry a set number of times or perform no retries if an attempt to retrieve subscriber information fails. Accordingly, the default retry mechanism may be overridden so that the network function 310 performs the one or more retries specified by the retry instruction (e.g., more retries than the set number of retries of the default retry mechanism).

Figure 4:
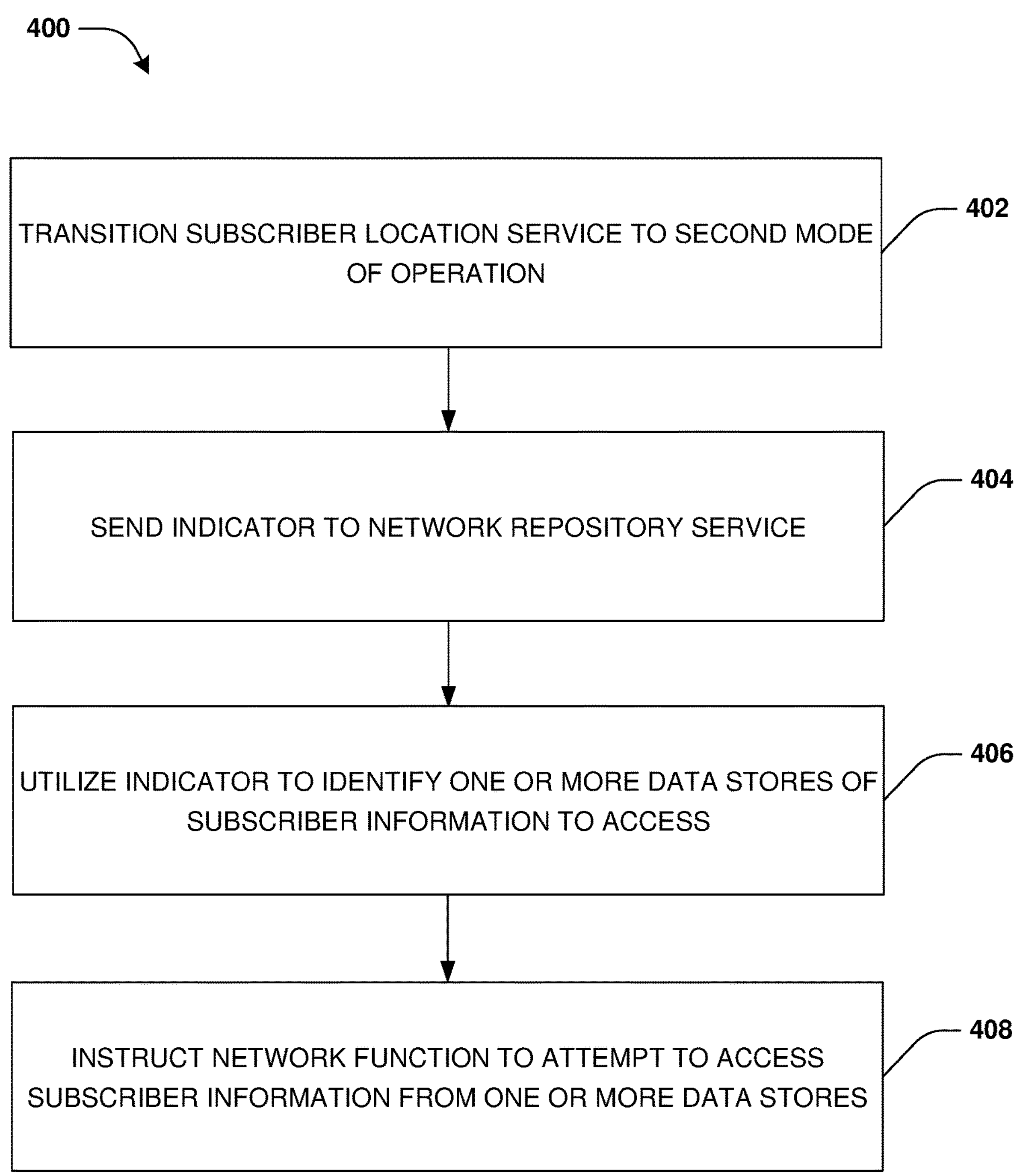
FIG. 4 is a flow chart illustrating an example method for locating subscriber information, in accordance with an embodiment of the present technology.
Figure 5A:
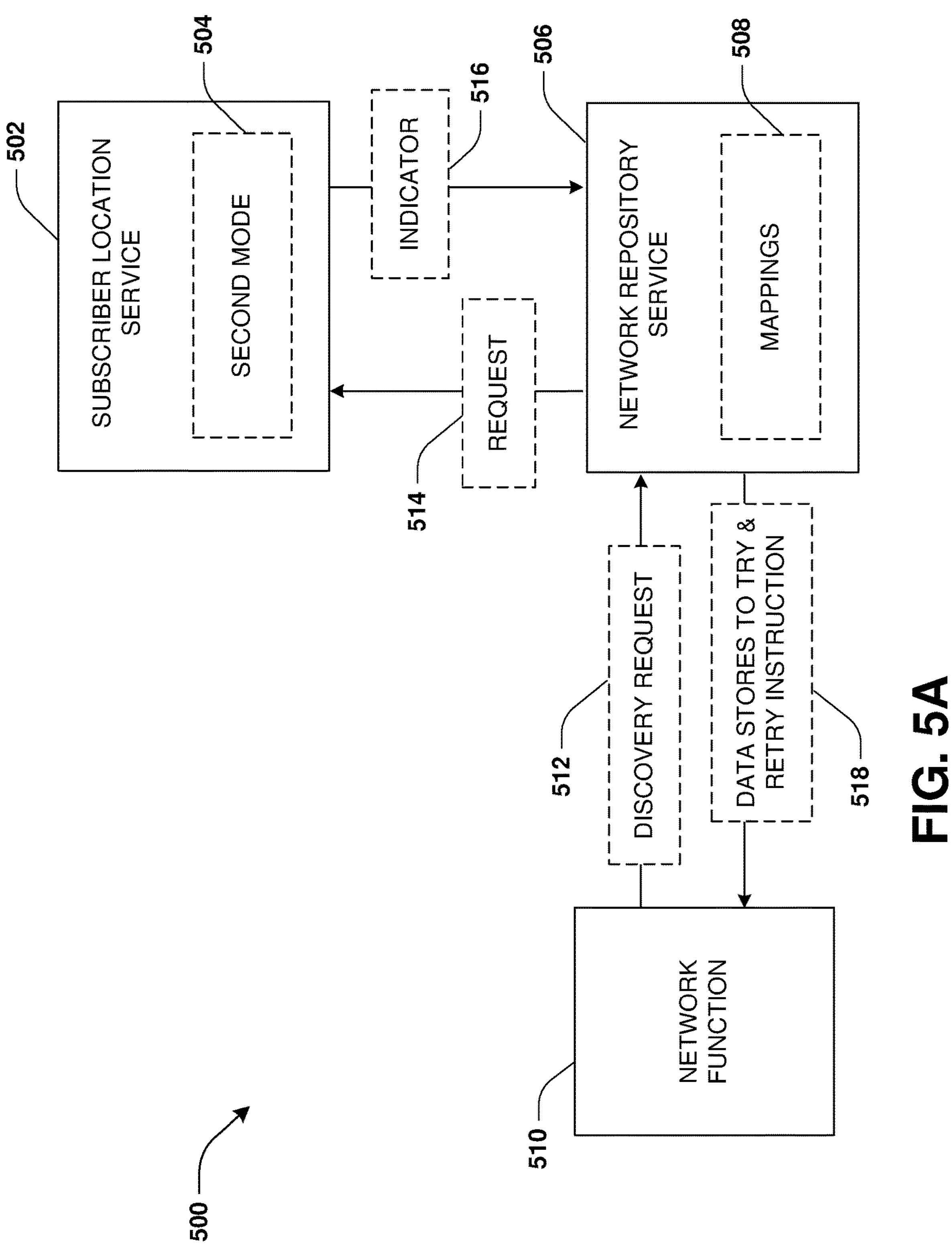
FIGS. 5A-5B illustrate an example of a system for locating subscriber information, in accordance with an embodiment of the present technology.
Figure 5B:
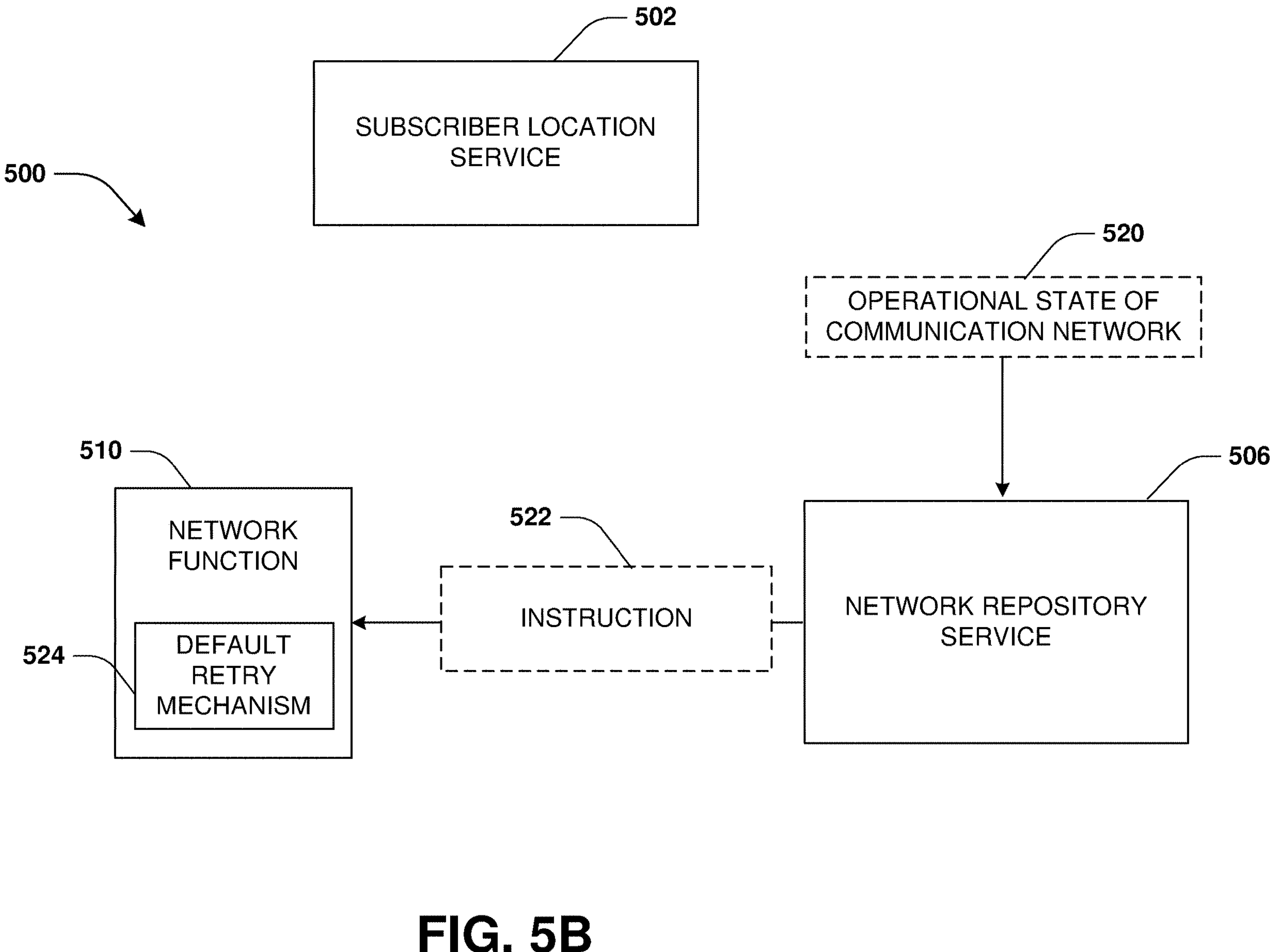

FIG. 4 is a flow chart illustrating an example method 400 for locating subscriber information, which is illustrated in conjunction with system 500 of FIGS. 5A and 5B. A trigger event may be detected for a communication network, such as an outage or issue that may occur where subscribers are not able to be provisioned with a subscriber location service 502. In response to detecting the trigger event, the subscriber location service 502 is transitioned from a first mode of operation (e.g., a normal mode) to a second mode of operation 504, during operation 402 of method 400.

A network function 510 may transmit a discovery request 512 to the network repository service 506 for a subscriber that is attempting to connect user equipment to a communication network, as illustrated by FIG. 5A. In response to the discovery request 512, the network repository service 506 may transmit a request 514 to the subscriber location service 502 for information that may be used to identify a data store within which subscriber information of the subscriber can be obtained. The subscriber location service 502 may receive the request 514 from the network repository service 506 while the subscriber location service 502 is in the second mode of operation 504. The subscriber location service 502 may utilize a subscriber identifier, such as an international mobile subscriber identity (ISMI) or other identifier from the request 514, to identify an entry for the subscriber identifier. However, the subscriber location service 502 may not locate the entry.

Because the subscriber location service 502 is in the second mode of operation 504 and cannot locate the entry, the subscriber location service 502 generates and transmits an indicator 516 to the network repository service 506, during operation 404 of method 400. The indicator 516 may include any type of information, such as an indicator that the network repository service 506 should not return an error to the network function 510, an indicator that the network repository service 506 should suggest one or more data stores for the network function 510 to attempt for locating the subscriber information, an indicator that the subscriber location service 502 is operating in the second mode of operation 504, an indicator that the subscriber location service 502 could not locate the subscriber, etc. In some embodiments, the subscriber location service 502 is configured to refrain from returning an error message while operating in the second mode of operation 504.

During operation 406 of method 400, the network repository service 506 may utilize the indicator 516 to identify a set of data stores of subscriber information for the network function 510 to access for attempting to locate the subscriber information. In some embodiments, the set of data stores may be specified by a mapping identified from a set of mappings 508 using the indicator 516. In some embodiments, the network repository service 506 may select the set of data stores as a random sample from a plurality of regions into which the communication network is partitioned. 516. In some embodiments, the network repository service 506 may select the set of data stores to include at least one data store from each region of the communication network. In this way, the network repository service 506 determines the set of data stores from which the network function 510 is to attempt to access the subscriber information of the subscriber.

During operation 408 of method 400, the network repository service 506 sends an instruction 518 the network function 510 to attempt to access the subscriber information from the one or more data stores. In some embodiments, the network repository service 506 includes a retry instruction within the instruction 518. In some embodiments, the retry instruction may instruct the network function 510 to perform one or more additional retries for locating the subscriber information compared to a default number of retries (e.g., 0 or more retries) configured within the network function 510. In some embodiments, the retry instruction may instruct the network function 510 to override a default retry mechanism of the network function 510 such that the network function 510 performs an increased number of retries for locating the subscriber information compared to the default retry mechanism.

In some embodiments, a second trigger event may be detected, such as an indication that the network outage has ended and/or that the subscriber location service 502 has been successfully updated with entries for subscribers. Accordingly, the subscriber location service 502 and/or the network repository service 506 may be transitioned to the first mode of operation. While in the first mode of operation, the subscriber location service may return an error message, as opposed to the indicator 516, if an entry for a subscriber is not found by the subscriber location service 502.

FIG. 5B illustrates the network repository service 506 being configured to provide instructions to network functions based upon operational states of a communication network. In some embodiments, the network repository service 506 identifies an operational state 520 of the communication network. Based upon the operational state 520, the network repository service 506 generates an instruction 522. The instruction 522 may instruct the network function 510 to override a default retry mechanism 524.

In some embodiments, the instruction 522 may instruct the network function 510 to increase a number of retries to perform for locating subscriber information compared to the default retry mechanism, such as where the operational state 520 corresponds to a transient network disruption. In some embodiments, the instruction 522 may instruct the network function 510 to decrease a number of retries to perform for locating subscriber information compared to the default retry mechanism, such as where the operational state 520 corresponds to a network traffic overload. In some embodiments, the instruction 522 may instruct the network function 510 to refrain from performing retries for locating subscriber information. In some embodiments, the instruction 522 may instruct the network function 510 to perform retries for obtaining subscriber information for existing communication sessions and to refrain from performing retries for obtaining subscriber information for new communication sessions. In this way, operation of the network function 510 is modified based upon the operational state 520 of the communication network.

According to some embodiments, a method is provided. The method includes in response to identifying a trigger event associated with a communication network, transitioning a subscriber location service from a first mode of operation to a second mode of operation; in response to the subscriber location service receiving, while in the second mode of operation, a request from a network repository service for a subscriber that cannot be located by the subscriber location service, sending an indicator to the network repository service that the subscriber could not be located and that the subscriber location service is operating in the second mode of operation; in response to the network repository service receiving the indicator, utilizing the indicator to identify a mapping that specifies one or more data stores of subscriber information to access for attempting to locate subscriber information of the subscriber; and instructing, by the network repository service, a network function to attempt to access the subscriber information from the one or more data stores.

According to some embodiments, the method includes sending a retry instruction to the network function to perform one or more additional retries for locating the subscriber information compared to a default number of retries configured within the network function.

According to some embodiments, the method includes overriding a default retry mechanism of the network function based upon an instruction from the network repository service, wherein the network function performs an increased number of retries for locating the subscriber information compared to the default retry mechanism.

According to some embodiments, the method includes determining an operational state of the communication network; generating, based upon the operational state, an instruction to increase a number of retries performed for locating the subscriber information; and transmitting the instruction to the network function.

According to some embodiments, the operational state corresponds to a transient network disruption.

According to some embodiments, the method includes determining an operational state of the communication network; generating, based upon the operational state, an instruction to decrease a number of retries performed for locating the subscriber information; and transmitting the instruction to the network function.

According to some embodiments, the operational state corresponds to network traffic overload.

According to some embodiments, the method includes transmitting an instruction to the network function to refrain from performing retries for locating the subscriber information, wherein the instruction is generated based upon an operational state of the communication network.

According to some embodiments, the method includes determining an operational state of the communication network; generating, based upon the operational state, an instruction to perform retries for obtaining subscriber information for existing communication sessions and to refrain from performing retries for obtaining subscriber information for new communication sessions; and transmitting the instruction to the network function.

According to some embodiments, a system comprising one or more processors configured for executing the instructions to perform operations, is provided. The operations include in response to identifying a first trigger event associated with a communication network, transitioning a subscriber location service from a first mode of operation to a second mode of operation; in response to the subscriber location service receiving, while in the second mode of operation, a first request from a network repository service for a first subscriber that cannot be located by the subscriber location service, sending an indicator to the network repository service that the first subscriber could not be located and that the subscriber location service is operating in the second mode of operation; in response to the network repository service receiving the indicator, utilizing the indicator to identify a set of data stores of subscriber information to access for attempting to locate subscriber information of the first subscriber; and instructing, by the network repository service, a network function to attempt to access the subscriber information from the set of data stores.

According to some embodiments, the operations include in response to identifying a second trigger event, transitioning the subscriber location service from the second mode of operation to the first mode of operation.

According to some embodiments, the operations include in response to the subscriber location service receiving, while in the first mode of operation, a second request from the network repository service for a second subscriber that cannot be located by the subscriber location service, returning an error message that the second subscriber cannot be found to the network repository service.

According to some embodiments, the subscriber location service is configured to refrain from returning the error message while operating in the second mode of operation.

According to some embodiments, the operations include sending a retry instruction to the network function to perform one or more additional retries for locating the subscriber information compared to a default number of retries configured within the network function.

According to some embodiments, the operations include overriding a default retry mechanism of the network function based upon an instruction from the network repository service, wherein the network function performs an increased number of retries for locating the subscriber information compared to the default retry mechanism.

According to some embodiments, a non-transitory computer-readable medium storing instructions that when executed facilitate performance of operations, is provided. The operations include in response to identifying a first trigger event associated with a communication network, transitioning a subscriber location service from a first mode of operation to a second mode of operation; in response to the subscriber location service receiving, while in the second mode of operation, a first request from a network repository service for a first subscriber that cannot be located by the subscriber location service, sending an indicator to the network repository service that the first subscriber could not be located and that the subscriber location service is operating in the second mode of operation; in response to the network repository service receiving the indicator, utilizing the indicator to identify a set of data stores of subscriber information to access for attempting to locate subscriber information of the first subscriber; and instructing, by the network repository service, a network function to attempt to access the subscriber information from the set of data stores.

According to some embodiments, the operations include selecting the set of data stores as a random sample from a plurality of regions within the communication network.

According to some embodiments, the operations include selecting the set of data stores to include at least one data store from each of a plurality of regions within the communication network.

According to some embodiments, the operations include sending a retry instruction to the network function to perform one or more additional retries for locating the subscriber information compared to a default number of retries configured within the network function.

According to some embodiments, the operations include overriding a default retry mechanism of the network function based upon an instruction from the network repository service, wherein the network function performs an increased number of retries for locating the subscriber information compared to the default retry mechanism.

Figure 6:
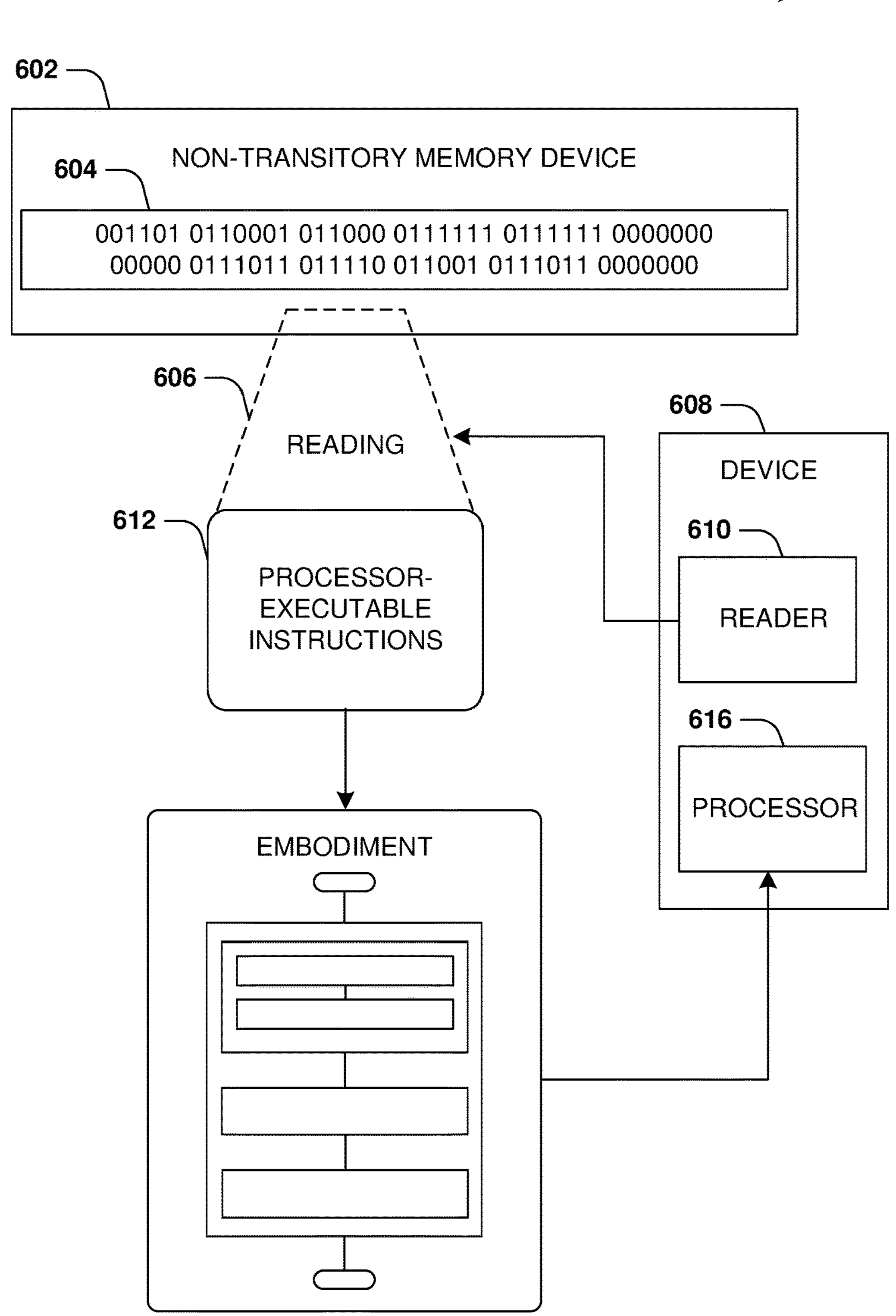
FIG. 6 is an illustration of example networks that may utilize and/or implement at least a portion of the techniques presented herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 400 of FIG. 4, for example. In some embodiments, the processor-executable instructions 612 are configured to cause implementation of a system, such as at least some of the example system 300 of FIGS. 3A-3C and/or at least some of the example system 500 of FIGS. 5A-5B.

Figure 7:
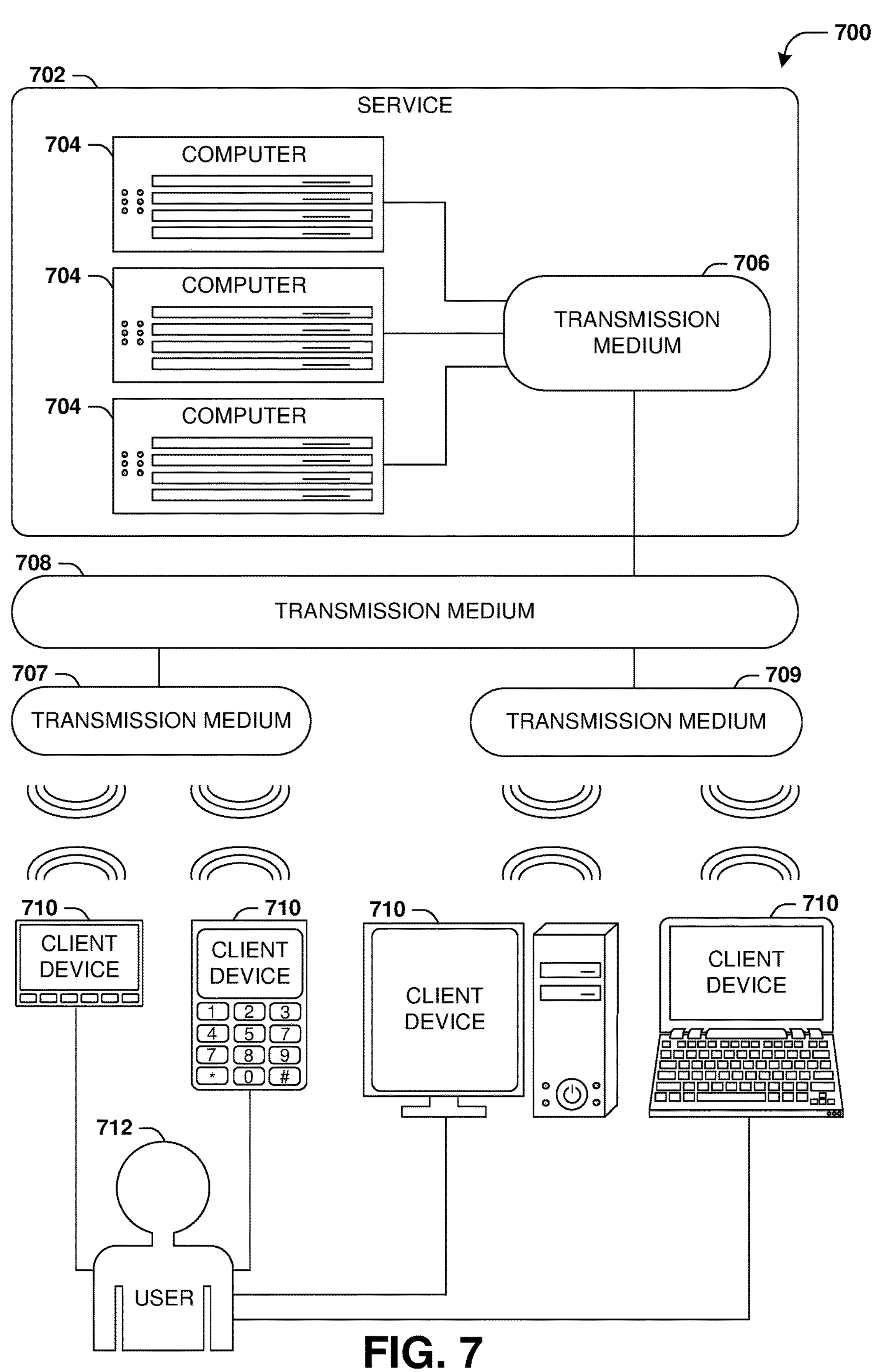
FIG. 7 is an illustration of a scenario involving an example configuration of a computer that may utilize and/or implement at least a portion of the techniques presented herein.

FIG. 7 is an interaction diagram of a scenario 700 illustrating a service 702 provided by a set of computers 704 to a set of client devices 710 via various types of transmission mediums. The computers 704 and/or client devices 710 may be capable of transmitting, receiving, processing, and/or storing many types of signals, such as in memory as physical memory states.

In some embodiments, the computers 704 may be host devices and/or the client device 710 may be devices attempting to communicate with the computer 704 over buses for which device authentication for bus communication is implemented.

The computers 704 of the service 702 may be communicatively coupled together, such as for exchange of communications using a transmission medium 706. The transmission medium 706 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 702.

Likewise, the transmission medium 706 may comprise one or more sub-networks, such as may employ different architectures, may be compliant or compatible with differing protocols and/or may interoperate within the transmission medium 706. Additionally, various types of transmission medium 706 may be interconnected (e.g., a router may provide a link between otherwise separate and independent transmission medium 706).

In scenario 700 of FIG. 7, the transmission medium 706 of the service 702 is connected to a transmission medium 708 that allows the service 702 to exchange data with other services 702 and/or client devices 710. The transmission medium 708 may encompass various combinations of devices with varying levels of distribution and exposure, such as a public wide-area network and/or a private network (e.g., a virtual private network (VPN) of a distributed enterprise).

In the scenario 700 of FIG. 7, the service 702 may be accessed via the transmission medium 708 by a user 712 of one or more client devices 710, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 710 may communicate with the service 702 via various communicative couplings to the transmission medium 708. As a first such example, one or more client devices 710 may comprise a cellular communicator and may communicate with the service 702 by connecting to the transmission medium 708 via a transmission medium 709 provided by a cellular provider. As a second such example, one or more client devices 710 may communicate with the service 702 by connecting to the transmission medium 708 via a transmission medium 709 provided by a location such as the user's home or workplace (e.g., a WiFi (Institute of Electrical and Electronics Engineers (IEEE) Standard 902.11) network or a Bluetooth (IEEE Standard 902.15.1) personal area network). In this manner, the computers 704 and the client devices 710 may communicate over various types of transmission mediums.

Figures 8, 9:
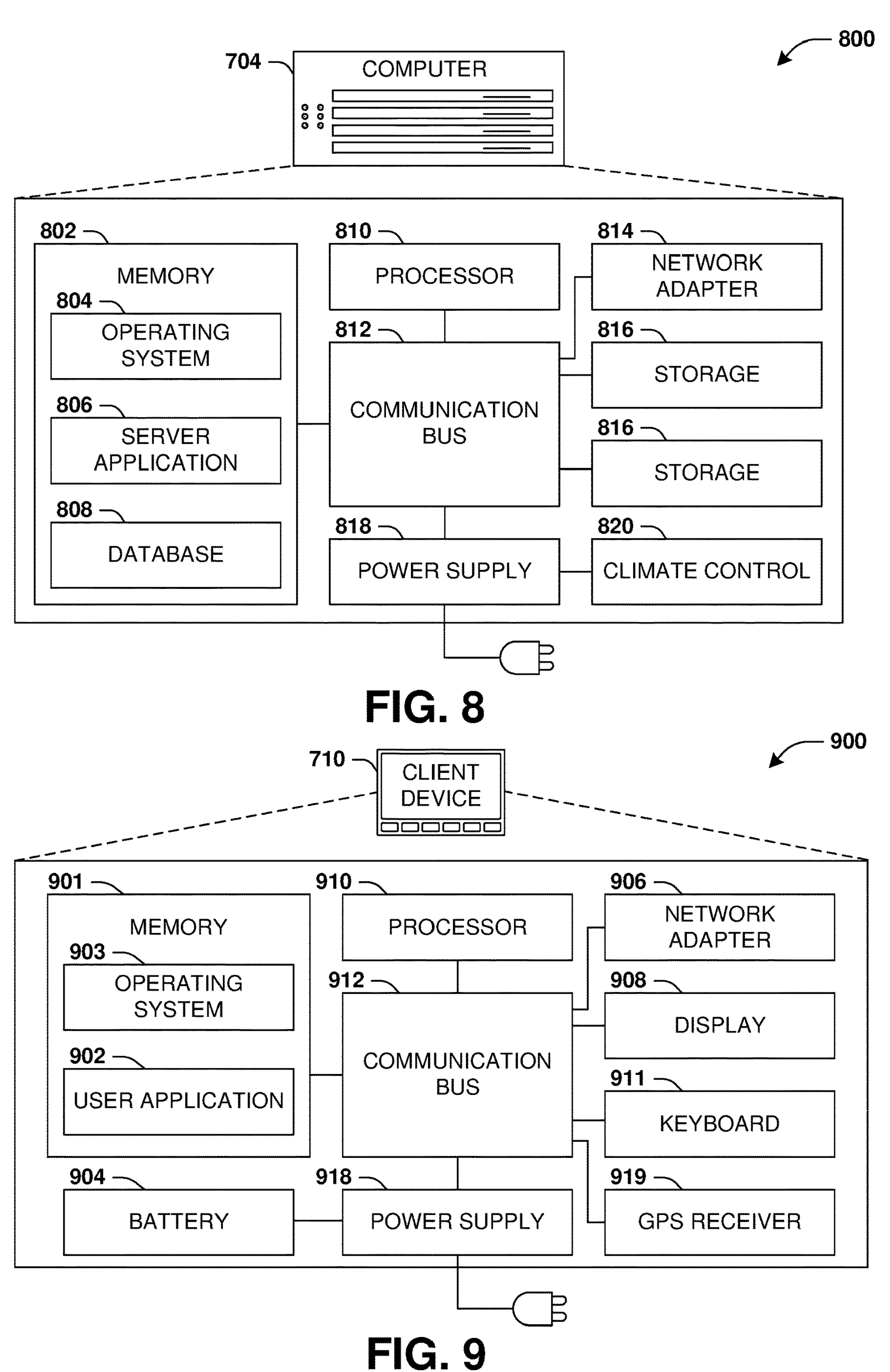
FIG. 8 is an illustration of a scenario involving an example configuration of a client that may utilize and/or implement at least a portion of the techniques presented herein.
FIG. 9 is an illustration of a scenario featuring an example non-transitory machine-readable medium in accordance with one or more of the provisions set forth herein.

FIG. 8 presents a schematic architecture diagram 800 of a computer 804 that may utilize at least a portion of the techniques provided herein. Such a computer 804 may vary widely in configuration or capabilities, alone or in conjunction with other computers, in order to provide a service.

The computer 604 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The computer 804 may comprise memory 802 storing various forms of applications, such as an operating system 804; one or more computer applications 806; and/or various forms of data, such as a database 808 or a file system. The computer 804 may comprise a variety of peripheral components, such as a wired and/or wireless network adapter 814 connectible to a local area network and/or wide area network; one or more storage components 816, such as a hard disk drive, a solid-state storage device (SSD), a flash memory device, and/or a magnetic and/or optical disk reader.

The computer 804 may comprise a mainboard featuring one or more communication buses 812 that interconnect the processor 810, the memory 802, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 812 may interconnect the computer 804 with at least one other computer. Other components that may optionally be included with the computer 804 (though not shown in the schematic architecture diagram 800 of FIG. 8) include a display; a display adapter, such as a graphical processing unit (GPU); input peripherals, such as a keyboard and/or mouse; and a flash memory device that may store a basic input/output system (BIOS) routine that facilitates booting the computer 804 to a state of readiness.

The computer 804 may operate in various physical enclosures, such as a desktop or tower, and/or may be integrated with a display as an "all-in-one" device. The computer 804 may be mounted horizontally and/or in a cabinet or rack, and/or may simply comprise an interconnected set of components. The computer 804 may comprise a dedicated and/or shared power supply 818 that supplies and/or regulates power for the other components. The computer 804 may provide power to and/or receive power from another computer and/or other devices. The computer 804 may comprise a shared and/or dedicated climate control unit 820 that regulates climate properties, such as temperature, humidity, and/or airflow. Many such computers 804 may be configured and/or adapted to utilize at least a portion of the techniques presented herein.

FIG. 9 presents a schematic architecture diagram 900 of a client device 810 whereupon at least a portion of the techniques presented herein may be implemented. Such a client device 810 may vary widely in configuration or capabilities, in order to provide a variety of functionality to a user such as the user 812. The client device 810 may be provided in a variety of form factors, such as a desktop or tower workstation; an "all-in-one" device integrated with a display 908; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 810 may serve the user in a variety of roles, such as a workstation, kiosk, media player, gaming device, and/or appliance.

The client device 810 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The client device 810 may comprise memory 901 storing various forms of applications, such as an operating system 903; one or more user applications 902, such as document applications, media applications, file and/or data access applications, communication applications such as web browsers and/or email clients, utilities, and/or games; and/or drivers for various peripherals. The client device 810 may comprise a variety of peripheral components, such as a wired and/or wireless network adapter 906 connectible to a local area network and/or wide area network; one or more output components, such as a display 908 coupled with a display adapter (optionally including a graphical processing unit (GPU)), a sound adapter coupled with a speaker, and/or a printer; input devices for receiving input from the user, such as a keyboard 911, a mouse, a microphone, a camera, and/or a touch-sensitive component of the display 908; and/or environmental sensors, such as a global positioning system (GPS) receiver 919 that detects the location, velocity, and/or acceleration of the client device 810, a compass, accelerometer, and/or gyroscope that detects a physical orientation of the client device 810. Other components that may optionally be included with the client device 810 (though not shown in the schematic architecture diagram 900 of FIG. 9) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 810 to a state of readiness; and a climate control unit that regulates climate properties, such as temperature, humidity, and airflow.

The client device 810 may comprise a mainboard featuring one or more communication buses 912 that interconnect the processor 910, the memory 901, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 810 may comprise a dedicated and/or shared power supply 918 that supplies and/or regulates power for other components, and/or a battery 904 that stores power for use while the client device 810 is not connected to a power source via the power supply 918. The client device 810 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

What is claimed:

1. A method, comprising:

in response to identifying a trigger event associated with a communication network, transitioning a subscriber location service from a first mode of operation to a second mode of operation;

in response to the subscriber location service receiving, while in the second mode of operation, a request from a network repository service for a subscriber that cannot be located by the subscriber location service, sending an indicator to the network repository service that the subscriber could not be located and that the subscriber location service is operating in the second mode of operation;

in response to the network repository service receiving the indicator, utilizing the indicator to identify a mapping that specifies one or more data stores of subscriber information to access for attempting to locate subscriber information of the subscriber; and instructing, by the network repository service, a network function to attempt to access the subscriber information from the one or more data stores.

2. The method of claim 1, comprising:

sending a retry instruction to the network function to perform one or more additional retries for locating the subscriber information compared to a default number of retries configured within the network function.

3. The method of claim 1, comprising:

overriding a default retry mechanism of the network function based upon an instruction from the network repository service, wherein the network function performs an increased number of retries for locating the subscriber information compared to the default retry mechanism.

4. The method of claim 1, comprising:

determining an operational state of the communication network;

generating, based upon the operational state, an instruction to increase a number of retries performed for locating the subscriber information; and transmitting the instruction to the network function.

5. The method of claim 4, wherein the operational state corresponds to a transient network disruption.

6. The method of claim 1, comprising:

determining an operational state of the communication network;

generating, based upon the operational state, an instruction to decrease a number of retries performed for locating the subscriber information; and transmitting the instruction to the network function.

7. The method of claim 6, wherein the operational state corresponds to network traffic overload.

8. The method of claim 1, comprising:

transmitting an instruction to the network function to refrain from performing retries for locating the subscriber information, wherein the instruction is generated based upon an operational state of the communication network.

9. The method of claim 1, comprising:

determining an operational state of the communication network;

generating, based upon the operational state, an instruction to perform retries for obtaining subscriber information for existing communication sessions and to refrain from performing retries for obtaining subscriber information for new communication sessions; and transmitting the instruction to the network function.

10. A system, comprising:

one or more processors configured for executing instructions to perform operations comprising:

in response to identifying a first trigger event associated with a communication network, transitioning a subscriber location service from a first mode of operation to a second mode of operation;

in response to the subscriber location service receiving, while in the second mode of operation, a first request from a network repository service for a first subscriber that cannot be located by the subscriber location service, sending an indicator to the network repository service that the first subscriber could not be located and that the subscriber location service is operating in the second mode of operation;

in response to the network repository service receiving the indicator, utilizing the indicator to identify a set of data stores of subscriber information to access for attempting to locate subscriber information of the first subscriber; and instructing, by the network repository service, a network function to attempt to access the subscriber information from the set of data stores.

11. The system of claim 10, wherein the operations comprise:

in response to identifying a second trigger event, transitioning the subscriber location service from the second mode of operation to the first mode of operation.

12. The system of claim 11, wherein the operations comprise:

in response to the subscriber location service receiving, while in the first mode of operation, a second request from the network repository service for a second subscriber that cannot be located by the subscriber location service, returning an error message that the second subscriber cannot be found to the network repository service.

13. The system of claim 12, wherein the subscriber location service is configured to refrain from returning the error message while operating in the second mode of operation.

14. The system of claim 10, wherein the operations comprise:

sending a retry instruction to the network function to perform one or more additional retries for locating the subscriber information compared to a default number of retries configured within the network function.

15. The system of claim 10, wherein the operations comprise:

overriding a default retry mechanism of the network function based upon an instruction from the network repository service, wherein the network function performs an increased number of retries for locating the subscriber information compared to the default retry mechanism.

16. A non-transitory computer-readable medium storing instructions that when executed facilitate performance of operations comprising:

in response to identifying a first trigger event associated with a communication network, transitioning a subscriber location service from a first mode of operation to a second mode of operation;

in response to the subscriber location service receiving, while in the second mode of operation, a first request from a network repository service for a first subscriber that cannot be located by the subscriber location service, sending an indicator to the network repository service that the first subscriber could not be located and that the subscriber location service is operating in the second mode of operation;

in response to the network repository service receiving the indicator, utilizing the indicator to identify a set of data stores of subscriber information to access for attempting to locate subscriber information of the first subscriber; and instructing, by the network repository service, a network function to attempt to access the subscriber information from the set of data stores.

17. The non-transitory computer-readable medium of claim 16, wherein the operations comprise:

selecting the set of data stores as a random sample from a plurality of regions within the communication network.

18. The non-transitory computer-readable medium of claim 16, wherein the operations comprise:

selecting the set of data stores to include at least one data store from each of a plurality of regions within the communication network.

19. The non-transitory computer-readable medium of claim 16, wherein the operations comprise:

sending a retry instruction to the network function to perform one or more additional retries for locating the subscriber information compared to a default number of retries configured within the network function.

20. The non-transitory computer-readable medium of claim 16, wherein the operations comprise:

overriding a default retry mechanism of the network function based upon an instruction from the network repository service, wherein the network function performs an increased number of retries for locating the subscriber information compared to the default retry mechanism.

* * * * *